(12) United States Patent
Lee

(10) Patent No.: US 10,662,860 B2
(45) Date of Patent: May 26, 2020

(54) COOLANT CONTROL VALVE UNIT AND ENGINE COOLING SYSTEM HAVING THE SAME

(71) Applicants: HYUNDAI MOTOR COMPANY, Seoul (KR); KIA MOTORS CORPORATION, Seoul (KR)

(72) Inventor: Hyo Jo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 99 days.

(21) Appl. No.: 16/171,564

(22) Filed: Oct. 26, 2018

(65) Prior Publication Data

US 2019/0186336 A1 Jun. 20, 2019

(30) Foreign Application Priority Data

Dec. 18, 2017 (KR) ........................ 10-2017-0174560

(51) Int. Cl.
| | |
|---|---|
| F01P 7/14 | (2006.01) |
| F01P 3/20 | (2006.01) |
| G05D 7/06 | (2006.01) |
| F01P 7/16 | (2006.01) |
| F16K 11/04 | (2006.01) |
| F16K 31/06 | (2006.01) |
| F01P 3/02 | (2006.01) |
| F01P 11/16 | (2006.01) |

(52) U.S. Cl.
CPC ................. *F01P 7/14* (2013.01); *F01P 3/02* (2013.01); *F01P 3/20* (2013.01); *F01P 7/165* (2013.01); *F16K 11/04* (2013.01); *F16K 31/0624* (2013.01); *G05D 7/0664* (2013.01); *F01P 11/16* (2013.01); *F01P 2003/028* (2013.01); *F01P 2007/146* (2013.01); *F01P 2025/31* (2013.01); *F01P 2060/04* (2013.01); *F01P 2060/08* (2013.01); *F01P 2060/16* (2013.01)

(58) Field of Classification Search
CPC ...... F01P 7/14; F01P 7/165; F01P 3/02; F01P 3/20; F01P 2060/16; F01P 2025/31; F01P 11/16; F01P 2003/028; F01P 2060/08; F01P 2007/146; F01P 2060/04; F16K 11/04; F16K 31/0624; G05D 7/0664
See application file for complete search history.

(56) References Cited

FOREIGN PATENT DOCUMENTS

KR 10-1744834 B1 6/2017

*Primary Examiner* — Jacob M Amick
*Assistant Examiner* — Charles Brauch
(74) *Attorney, Agent, or Firm* — Brinks Gilson & Lione

(57) ABSTRACT

A coolant control valve unit includes: a valve housing including an inlet through which coolant is supplied, first and second coolant chambers fluidly isolated from each other, first and second passages respectively communicating the inlet with the first and second coolant chambers, and first and second outlets respectively communicated with the first and second coolant chambers; first and second valves disposed respectively in the first and second passages to be movable in a predetermined direction and respectively closing or opening the first and second passages; a driving plate connected with the first and second valves respectively through first and second stems and simultaneously moving the first and second valves in the predetermined direction by a distance; and an actuator moving the driving plate in the predetermined direction to control opening or closing of the first and second passages.

16 Claims, 6 Drawing Sheets

COOLANT CONTROL VALVE UNIT AND ENGINE COOLING SYSTEM HAVING THE SAME

CROSS-REFERENCE TO RELATED APPLICATION

This application claims priority to and the benefit of Korean Patent Application No. 10-2017-0174560, filed on Dec. 18, 2017, the entire contents of which are incorporated herein by reference.

FIELD

The present disclosure relates to a coolant control valve unit and an engine cooling system having the same that reduce warming-up time and fuel consumption.

BACKGROUND

The statements in this section merely provide background information related to the present disclosure and may not constitute prior art.

An engine produces power by burning fuel. A portion of the power produced by the engine is used to propel a vehicle and the other portion of the power is consumed as thermal energy. In particular, coolant absorbs thermal energy during circulating through the engine and radiates absorbed heat through a radiator.

If coolant temperature is low, frictional force increases due to increased viscosity of an engine oil, fuel consumption increases, a temperature of an exhaust gas rises slowly to increase time for activating a catalyst, and quality of the exhaust gas is deteriorated. Further, time for activating a heater also increases.

If the coolant temperature is excessively high, knocking occurs. To suppress occurrence of knocking, ignition timing should be controlled. In this case, engine performance may be deteriorated. In addition, if a temperature of a lubricant is excessively high, lubrication may be deteriorated.

Therefore, the coolant temperature at a specific position of the engine maintains high while the coolant temperature at another position of the engine maintains low. Recently, it has been developed and applied that supply of coolant to several cooling components is controlled by one coolant control valve unit.

Meanwhile, in order to control coolant supplied to a radiator, a heater, an oil cooler, and so on by using one coolant control valve unit, several valves are disposed in a housing and a cam is configured to selectively lift such valves. In this case, the cam rotates and controls opening or closing of the valves.

In this configuration, however, we have discovered that frictional abrasion occurs between the cam and the valves and a gap can be formed between the cam and the valves. In this case, it may be hard to precisely control opening timing or closing timing of the valves, or durability of components may be deteriorated. Therefore, management and maintenance costs may increase.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a coolant control valve unit and an engine cooling system having the same having advantages of improving durability and control precision by removing a structure in which opening or closing of valves is controlled by a cam.

In one form of the present disclosure, a coolant control valve unit may include: a valve housing including: an inlet through which coolant is supplied, first and second coolant chambers fluidly isolated from each other, first and second passages communicating the inlet with the first and second coolant chambers respectively, and first and second outlets respectively communicated with the first and second coolant chambers. And the coolant control valve further includes; first and second valves disposed respectively in the first and second passages to be movable in a predetermined direction and respectively closing and opening the first and second passages; a driving plate connected with the first and second valves respectively through first and second stems and simultaneously moving the first and second valves in the predetermined direction by a distance; and an actuator moving the driving plate in the predetermined direction to control opening or closing of the first and second passages, wherein the first passage has a first length along the predetermined direction, the second passage has a second length along the predetermined direction, and the first length is smaller than the second length such that the first and second passages are sequentially opened when the driving plate moves in the predetermined direction.

The valve housing may further include a third coolant chamber fluidly isolated from the first and second coolant chambers, a third passage communicating the inlet to the third coolant chamber, and a third outlet communicated with the third coolant chamber, The coolant control valve unit may further include a third valve disposed in the third passage to be movable in the predetermined direction and closing or opening the third passage.

The driving plate may be connected with the third valve through a third stem and simultaneously may move the first, second, and third valves in the predetermined direction by the distance. The actuator may move the driving plate in the predetermined direction to control opening or closing of the first, second, and third passages. The third passage may have a third length in the predetermined direction and the third length may be larger than the second length such that the first, second, and third passages are sequentially opened when the driving plate moves in the predetermined direction.

The actuator may be a solenoid type.

The actuator may include: a driving rod having an end connected to the driving plate and the other end opposite to the end, and extending in the predetermined direction; an armature coupled to the other end of the driving rod; a coil wound around the driving rod and applying force to the armature to move the armature to a side in the predetermined direction by receiving electric power; and an elastic member applying elastic force to the armature to the other side opposite to the side in the predetermined direction.

The actuator may further include a position detecting sensor detecting a position of the armature.

The actuator may be a cylinder type operated by pneumatic pressure or hydraulic pressure.

The actuator may include: a driving rod having an end connected to the driving plate and the other end opposite to the end, and extending in the predetermined direction; a piston coupled to the other end of the driving rod; a line for supplying pneumatic pressure or hydraulic pressure to the piston to move the piston to a side in the predetermined direction; a control valve disposed on the line and controlling supplying or discharging the pneumatic pressure or the hydraulic pressure; and an elastic member applying elastic force to the armature to the other side opposite to the side in the predetermined direction.

An engine cooling system according to another exemplary form of the present disclosure may include: a cylinder block; a cylinder head disposed on the cylinder block; and a coolant control valve unit receiving coolant discharged from the cylinder block or the cylinder head and supplying the coolant to cooling components, wherein the coolant control valve unit is the coolant control valve unit according to the exemplary form of the present disclosure.

The cooling components may include a low-pressure exhaust gas recirculation (EGR) cooler, a heater, an EGR valve, an oil cooler and a radiator.

The low-pressure EGR cooler and the heater may be connected to the first outlet to receive the coolant simultaneously, the EGR valve and the oil cooler may be connected to the second outlet to receive the coolant simultaneously, and the radiator may be connected to the third outlet to receive the coolant.

According to the exemplary forms of the present disclosure, abrasion does not occur between a cam and a stem by simultaneously lifting several valves without using the cam. Therefore, durability of the coolant control valve unit may be improved.

In addition, weight and cost may be reduced by simplifying engaging structures of the components.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
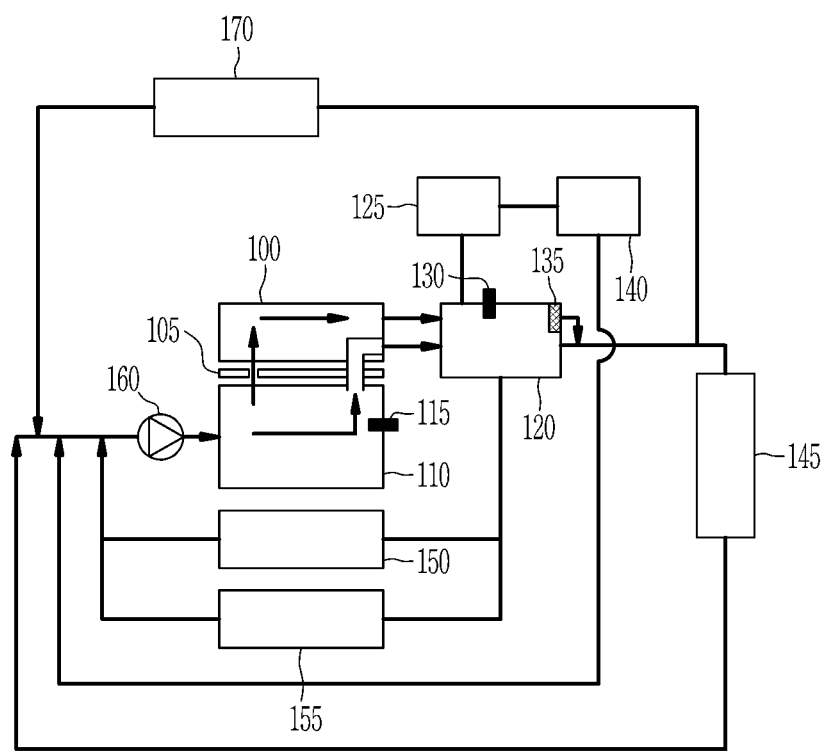
FIG. 1 is a schematic diagram of an engine cooling system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The size and thickness of each configuration shown in the drawings are arbitrarily shown for understanding and ease of description, but the present disclosure is not limited thereto, and the thickness of layers, films, panels, regions, etc., are exaggerated for clarity.

Description of components that are not necessary for explaining the present exemplary form will be omitted, and the same constituent elements are denoted by the same reference numerals in this specification.

In the following description, dividing names of components into first, second and the like is to divide the names because the names of the components are the same as each other and an order thereof is not particularly limited.

FIG. 1 is a schematic diagram of an engine cooling system according to an exemplary form of the present disclosure.

Referring to FIG. 1, an engine cooling system includes a cylinder head 100, a head gasket 105, a cylinder block 110, a block coolant temperature sensor 115, a coolant control valve unit 120, a valve coolant temperature sensor 130, a safety valve 135, a reservoir tank 170, a low-pressure exhaust gas recirculation (EGR) cooler 125, a heater 140, a radiator 145, an EGR valve 150, an oil cooler 155 and a coolant pump 160.

The cylinder block 110 is disposed on the cylinder head 100 and the head gasket 105 is disposed between the cylinder block 110 and the cylinder head 100.

The coolant pump 160 is mounted at a side of the cylinder block 110 and the coolant control valve unit 120 is mounted at an opposite side of the cylinder head 100.

Coolant pumped by the coolant pump 160 is supplied to the side of the cylinder block 110, a portion of the coolant supplied to the cylinder block 110 is supplied to the side of the cylinder head 100 after passing through the head gasket 105, and the other portion of the coolant supplied to the cylinder block 110 circulates in the cylinder block 110 and flows to the opposite side of the cylinder block 110.

The coolant flowing to the opposite side of the cylinder block 110 passes through the head gasket 105 and is supplied to the coolant control valve unit 120 engaged to the opposite side of the cylinder head 100.

The coolant supplied from the side of the cylinder block 110 to the side of the cylinder head 100 circulates in the cylinder head 100 and flows to the opposite side of the cylinder head 100. After that, the coolant is supplied to the coolant control valve unit 120 mounted at the opposite side of the cylinder head 100.

The coolant control valve unit 120 selectively receives the coolant from the cylinder block 110 and continuously receives the coolant from the cylinder head 100 according to operation of the coolant pump 160. In another aspect, the coolant control valve unit 120 can receive the coolant from the cylinder block 110 or the cylinder head 100 selectively or continuously.

The cylinder block 110 is provided with a block coolant temperature sensor 115 which detects a temperature of the coolant passing through the cylinder block 110, and the coolant control valve unit 120 is provided with a valve coolant temperature sensor 130 which detects the temperature of the coolant passing through the coolant control valve unit 120.

The coolant control valve unit 120 controls supply of the coolant to the low-pressure EGR cooler 125, the heater 140, the radiator 145, the low-pressure EGR cooler 125 and the oil cooler 155.

An EGR line (not shown) is bifurcated from an exhaust line at a downstream side of a turbocharger (not shown) and is joined to an intake line. The low-pressure EGR cooler 125 is mounted on the EGR line and cools a recirculated exhaust gas (EGR gas). The heater 140 is configured to warm up a cabin of a vehicle.

The radiator 145 is configured to throw off heat of the coolant to the atmosphere, and the EGR valve 150 is mounted on the EGR line and controls a flow rate of the EGR gas. The oil cooler 155 is configured to cool oil circulating in the engine.

A bifurcation line is bifurcated from a coolant line connecting the coolant control valve unit 120 to the radiator 145 and is joined to the coolant pump 160. The reservoir tank 170 is disposed on the bifurcation line. The reservoir tank 170 gathers bubbles in the coolant or the coolant is replenished into the cooling system through the reservoir tank 170.

The safety valve 135 may be a thermostat operated according to the coolant temperature. If the coolant control valve unit 120 is out of order and the coolant temperature rises excessively, the safety valve 135 opens a bypass passage connected to the radiator 145. Therefore, if the safety valve 135 operates, the coolant flows to the radiator 145.

Here, cooling components mean constituent elements actually using the coolant and includes the cylinder head, the cylinder block, the oil cooler, the EGR cooler, the heater, the radiator, a transmission oil warmer, the EGR valve, and etc.

Figure 2:
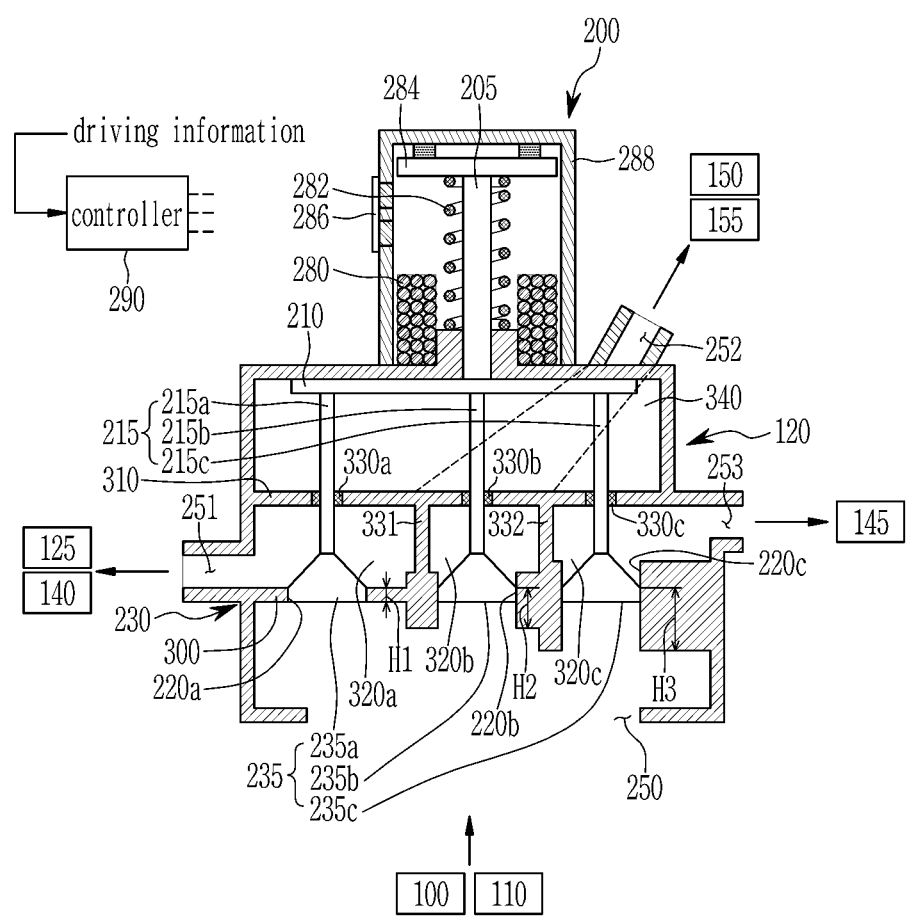
FIG. 2 is a cross-sectional view illustrating a state where first, second, and third passages are closed in a coolant control valve unit according to an exemplary form of the present disclosure.

FIG. 2 is a cross-sectional view illustrating a state where first, second, and third passages are closed in a coolant control valve unit according to an exemplary form of the present disclosure.

Referring to FIG. 2, the coolant control valve unit 120 includes a valve housing 230, a first passage 220a, a second passage 220b, a third passage 220c, valves 235, stems 215, a driving plate 210, an actuator 200, an inlet 250, a first outlet 251, a second outlet 252, and a third outlet 253.

The valves 235 include a first valve 235a, a second valve 235b and a third valve 235c, and the stems 215 include a first stem 215a, a second stem 215b and a third stem 215c.

The valve housing 230 has a side in a first direction which is open, and the inlet 250 is formed at the side in the first direction. The actuator 200 is disposed at an opposite side of the valve housing 230. In addition, two lateral walls 300 and 310 which extend in a second direction which is perpendicular to the first direction are formed in the valve housing 240. The lateral walls 300 and 310 are disposed apart from each other. The first lateral wall 300 is disposed close to the inlet 250 and the second lateral wall 310 is disposed close to the actuator 200. In addition, two vertical walls 331 and 332 extending in the first direction are formed between the first lateral wall 300 and the second lateral wall 310.

Three coolant chambers 320a, 320b, and 320c are formed in the valve housing 240 by the first and second lateral walls 300 and 310 and the first and second vertical walls 331 and 332. The first coolant chamber 320a fluidly communicates with the first outlet 251, the second coolant chamber 320b fluidly communicates with the second outlet 252, and the third coolant chamber 320c fluidly communicates with the third outlet 253. The first, second, and third coolant chambers 320a, 320b, and 320c do not fluidly communicate with each other. That is, the coolant flowing into the first coolant chamber 320a does not flow to the second coolant chamber 320b or the third coolant chamber 320c in the valve housing 230. Similarly, the coolant flowing into the second coolant chamber 320b does not flow to the first and third coolant chambers 320a and 320c in the valve housing 230, and the coolant flowing into the third coolant chamber 320c does not flow to the first and second coolant chambers 320a and 320b in the valve housing 230.

In addition, a driving room 340 is formed between the second lateral wall 310 and the opposite side of the valve housing 240 in the first direction, and the driving plate 210 is movably disposed in the driving room 340.

First, second, and third passages 220a, 220b, and 220c are formed at the first lateral wall 300 in the first direction, and first, second, and third stem holes 330a, 330b, and 330c are formed at the second lateral wall 310 in the first direction. The first, second, and third valves 235a, 235b, and 235c are disposed respectively in the first, second, and third passages 220a, 220b, and 220c. The first, second, and third stems 215a, 215b, and 215c are disposed respectively in the first, second, and third stem holes 330a, 330b, and 330c to be movable in the first direction. In order to maintain airtightness of the first, second, and third coolant chambers 320a, 320b, and 320c, sealing members may be mounted at the first, second, and third stem holes 330a, 330b, and 330c to enclose the first, second, and third stems 215.

The inlet 250 receives the coolant from the cylinder head 100 or the cylinder block 110. The coolant supplied to the coolant control valve unit 120 through the inlet 250 is supplied to the respective cooling components through at least one of the first outlet 251, the second outlet 252 and the third outlet 253.

The first valve 235a is disposed in the first passage 220a to be movable in the first direction and selectively opens or closes the first passage 220a. If the first valve 235a opens the first passage 220a, the coolant flowing through the inlet 250 flows into the first coolant chamber 320a and is then supplied to the low-pressure EGR cooler 125 and the heater 140 through the first outlet 251.

The second valve 235b is disposed in the second passage 220b to be movable in the first direction and selectively opens or closes the second passage 220b. If the second valve 235b opens the second passage 220b, the coolant flowing through the inlet 250 flows into the second coolant chamber 320b and is then supplied to the EGR valve 150 and the oil cooler 155 through the second outlet 252.

The third valve 235c is disposed in the third passage 220c to be movable in the first direction and selectively opens or closes the third passage 220c. If the third valve 235c opens the third passage 220c, the coolant flowing through the inlet 250 flows into the third coolant chamber 320c and is then supplied to the radiator 145 through the third outlet 253.

The first, second, and third stems 215a, 215b, and 215c extend in the first direction. An end of the first stem 215a is connected to a side of the first valve 235a and the opposite end of the first stem 215a is connected to a side of the driving plate 210. An end of the second stem 215b is connected to a side of the second valve 235b and the opposite end of the second stem 215b is connected to the side of the driving plate 210. An end of the third stem 215c is connected to a side of the third valve 235c and the opposite end of the third stem 215c is connected to the side of the driving plate 210. Therefore, if the driving plate 210 moves by a distance in the first direction, the first, second, and third stems 215a, 215b, and 215c and the first, second, and third valves 235a, 235b, and 235c simultaneously move by the same distance in the first direction.

The actuator 200 includes a driving rod 205. An end of the driving rod 205 is connected to the opposite side of the driving plate 210 and an opposite end of the driving rod 205 extends in the first direction.

The actuator 200 is configured to move the driving rod 205 in the first direction. The actuator 200 moves the first, second, and third valves 235a, 235b, and 235c simultaneously by the same distance in the first direction through the driving plate 210 and the first, second, and third stems 215a, 215b, and 215c.

In further detail, the actuator 200 is an actuator of solenoid type, and further includes a coil 280, an elastic member 282, an armature 284, a housing 288 and a position detecting sensor 286.

The housing 288 is disposed at the opposite side of the valve housing 230 in the first direction, and the coil 280, the elastic member 282, and the armature 284 are mounted in the housing 288. In addition, the driving rod 205 is inserted in the housing 288 to be movable in the first direction.

An end of the driving rod 205 is connected to the driving plate 210 and an opposite end of the driving rod 205 is coupled to the armature 284. The armature 284 is disposed in parallel with the driving plate 210.

The coil 280 is disposed around the driving rod 205 and applies force to the armature 284 to move the armature 284 to the side in the first direction. That is, if electric power is applied to the coil 280, the armature 284 moves to the side in the first direction. In this case, the first, second, and third valves 235a, 235b, and 235c connected to the armature 284 through the driving rod 205, the driving plate 210 and the first, second, and third stems 215a, 215b, and 215c also move t the side in the first direction and can open the first, second, and third passages 220a, 220b, and 220c.

The elastic member 282 is disposed between the armature 284 and an opposite side of the valve housing 230 and applies elastic force to the armature 284 to an opposite side in the first direction. That is, if electric power is not applied to the coil 280, the elastic member 282 causes the armature 284 to move to the opposite side in the first direction. In this case, the first, second, and third valves 235a, 235b, and 235c connected to the armature 284 through the driving rod 205, the driving plate 210 and the first, second, and third stems 215a, 215b, and 215c moves to the opposite side in the first direction and can close the first, second, and third passages 220a, 220b, and 220c. The position detecting sensor 286 detects a position of the armature 284, and the controller 290 controls the electric power applied to the coil 280 according to driving information to control the position of the armature 284. Therefore, opening or closing of the first, second, and third passages 220a, 220b, and 220c can be controlled.

According to the exemplary form of the present disclosure, the first, second, and third passages 220a, 220b, and 220c open sequentially as the armature 284 moves to the side in the first direction. For this purpose, the first passage 220a has a first length H1, the second passage 220b has a second length H2, and the third passage 220c has a third length H3. Here, lengths of the first, second, and third passages 220a, 220b, and 220c mean distances from initial positions of the first, second, and third valves 235a, 235b, and 235c (i.e., positions of the first, second, and third valves 235a, 235b, and 235c when the electric power is not applied to the coil 280) to ends of the first, second, and third passages 220a, 220b, and 220c in the first direction, respectively. The third length H3 is larger than the second length H2, and the second length H2 is larger than the first length H1. Therefore, as the armature 284 moves to the side in the first direction the first, second, and third passages 220a, 220b, and 220c opens sequentially.

As shown in FIG. 2, if the electric power is not applied to the coil 280, the driving plate 210 maintains contact position with the opposite side of the valve housing 230 in the first direction by the elastic force of the elastic member 282. In this case, the first, second, and third valves 235a, 235b, and 235c stay at their initial positions, and all the first, second, and third passages 220a, 220b, and 220c are closed. Therefore, the coolant is supplied to none of the cooling components.

Figure 3:
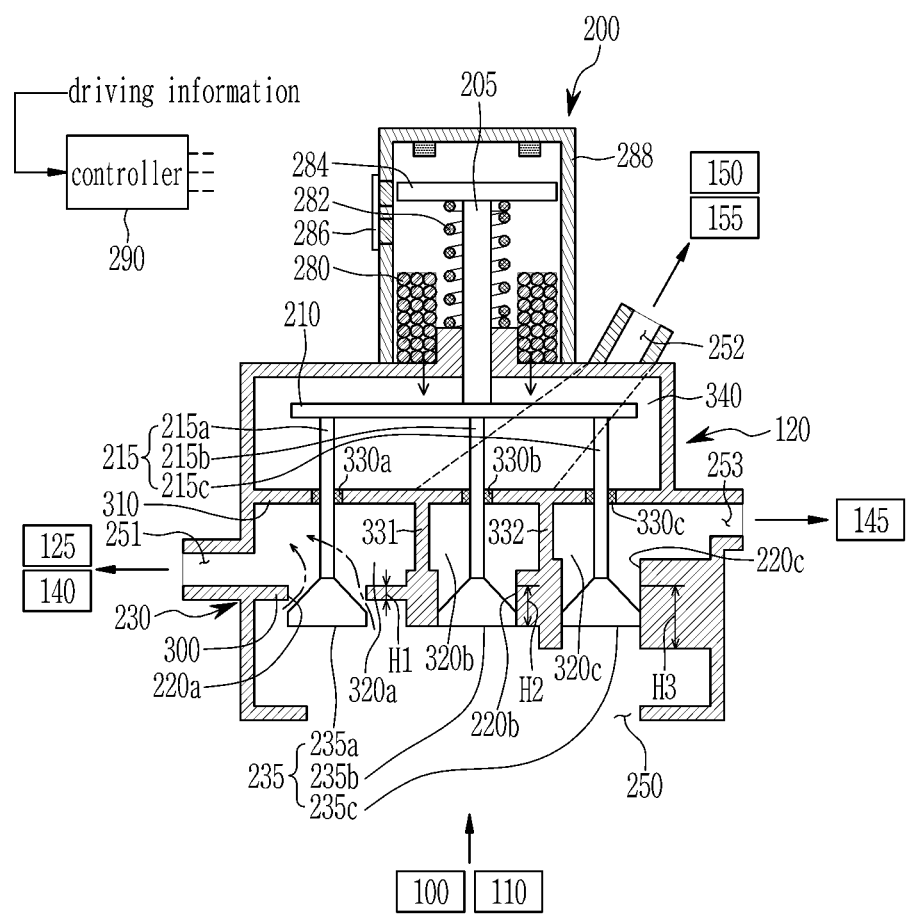
FIG. 3 is a cross-sectional view illustrating a state where first passage is open in a coolant control valve unit according to an exemplary form of the present disclosure.

FIG. 3 is a cross-sectional view illustrating a state where first passage is open in a coolant control valve unit according to an exemplary form of the present disclosure.

As shown in FIG. 3, the controller 290 controls the electric power applied to the coil 280 based on the driving information to move the armature 284 to the side in the first direction by a distance larger than or equal to the first length H1 and smaller than the second length H2. In this case, all the first, second, and third valves 235a, 235b, and 235c move to the side in the first direction by the distance larger than or equal to the first length H1 and smaller than the second length H2. Therefore, the first valve 235a opens the first passage 220a and the second and third valves 235b and 235c close the second and third passages 220b and 220c.

Therefore, the coolant supplied through the inlet 250 is supplied to the low-pressure EGR cooler 125 and the heater 140, and is not supplied to the EGR valve 150, the oil cooler 155, and the radiator 145.

Figure 4:
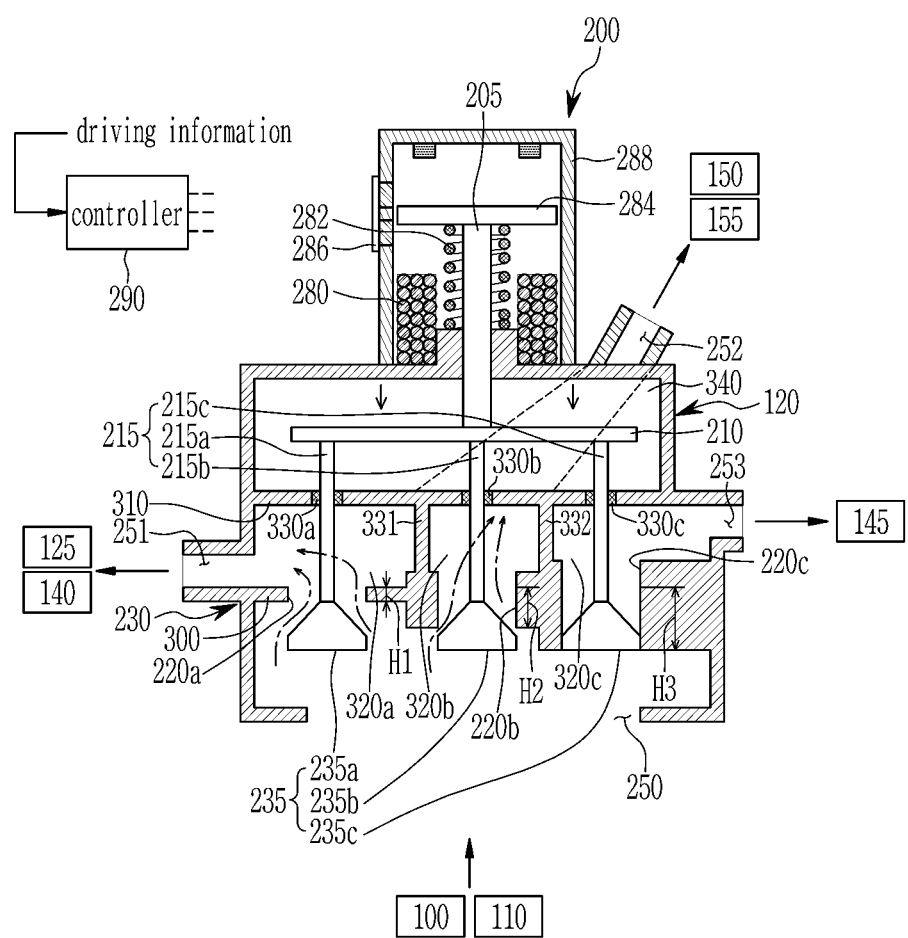
FIG. 4 is a cross-sectional view illustrating a state where first and second passages are open in a coolant control valve unit according to an exemplary form of the present disclosure.

FIG. 4 is a cross-sectional view illustrating a state where first and second passages are open in a coolant control valve unit according to an exemplary form of the present disclosure.

The controller 290 controls the electric power applied to the coil 280 based on the driving information to move the armature 284 to the side in the first direction by a distance larger than or equal to the second length H2 and smaller than the third length H3. In this case, all the first, second, and third valves 235a, 235b, and 235c move to the side in the first direction by the distance larger than or equal to the second length H2 and smaller than the third length H3. Therefore, the first and second valves 235a and 235b open the first and second passages 220a and 220b, and the third valve 235c closes the third passage 220c.

Therefore, the coolant supplied through the inlet 250 is supplied to the low-pressure EGR cooler 125, the heater 140, the EGR valve 150, and the oil cooler 155, and is not supplied to the radiator 145.

Figure 5:
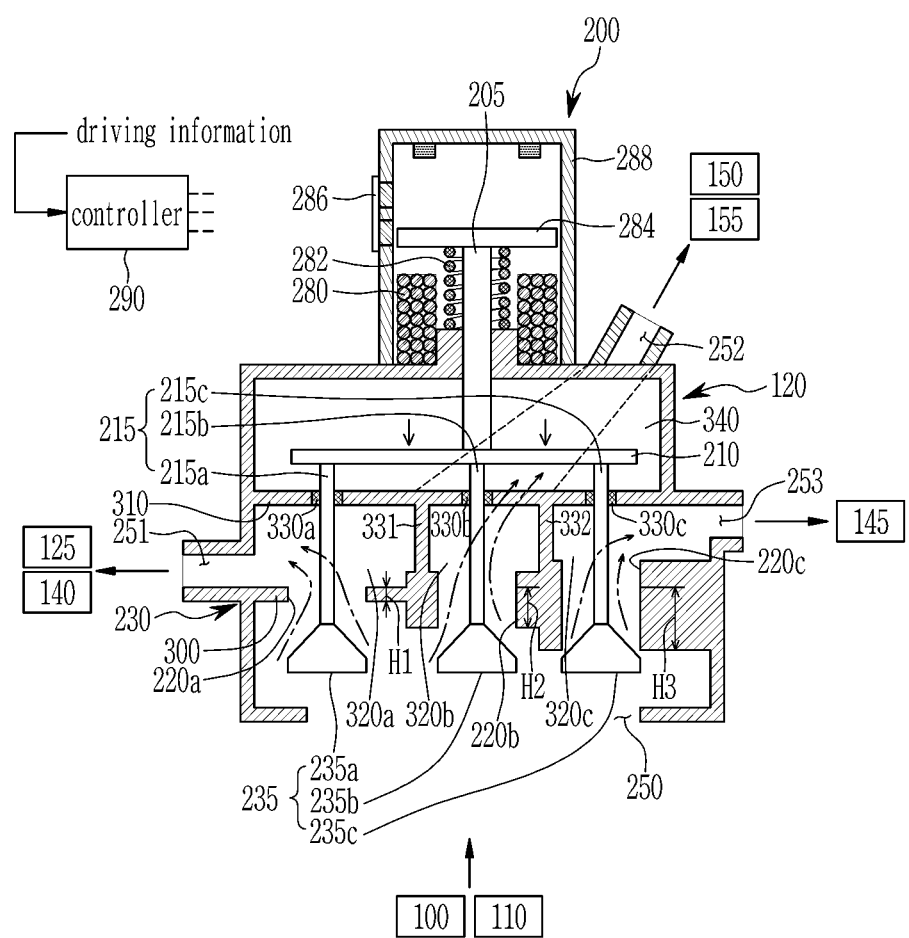
FIG. 5 is a cross-sectional view illustrating a state where first, second, and third passages are open in a coolant control valve unit according to an exemplary form of the present disclosure.

FIG. 5 is a cross-sectional view illustrating a state where first, second, and third passages are open in a coolant control valve unit according to an exemplary form of the present disclosure.

As shown in FIG. 5, the controller 290 controls the electric power applied to the coil 280 based on the driving information to move the armature 284 to the side in the first direction by a distance larger than the third length H3. In this case, all the first, second, and third valves 235a, 235b, and 235c move to the side in the first direction by the distance larger than the third length H3. Therefore, all the first, second, and third valves 235a, 235b, and 235c open the first, second, and third passages 220a, 220b, and 220c.

Therefore, the coolant supplied through the inlet 250 is supplied to the low-pressure EGR cooler 125, the heater 140, the EGR valve 150, the oil cooler 155, and the radiator 145.

Figure 6:
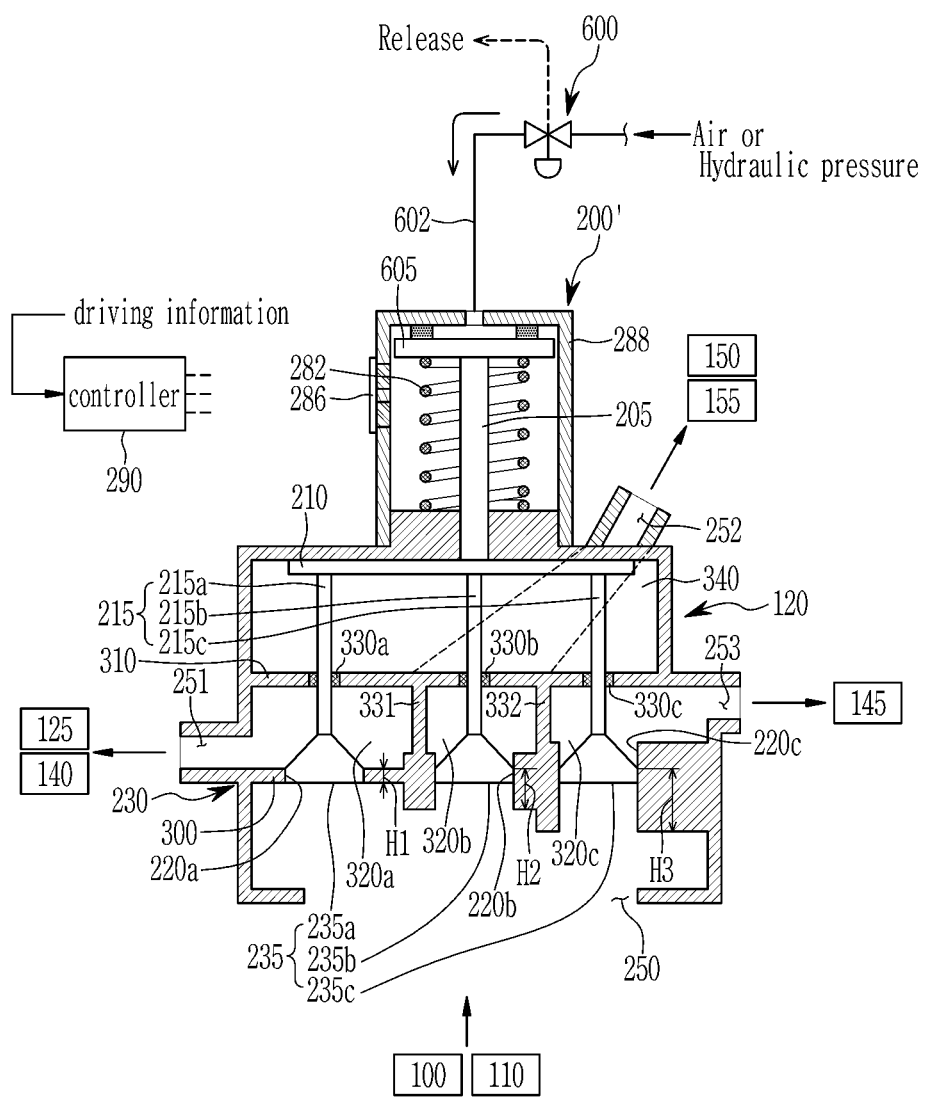
FIG. 6 is a cross-sectional view of a coolant control valve unit according to another exemplary form of the present disclosure.

FIG. 6 is a cross-sectional view of a coolant control valve unit according to another exemplary form of the present disclosure.

The coolant control valve unit according to another exemplary form of the present disclosure is the same as the coolant control valve unit according to the exemplary form of the present disclosure except a type of the actuator. Therefore, the actuator will be described in detail.

In further detail, the actuator 200' is a cylinder type operated by hydraulic pressure or pneumatic pressure, and includes the driving rod 205, the elastic member 282, a piston 605, a control valve 600, the housing 288, and the position detecting sensor 286.

The housing 288 is disposed at the opposite side of the valve housing 230 in the first direction.

The end of the driving rod 205 is connected to the driving plate 210 and the opposite end of the driving rod 205 is coupled to a side of the piston 605. The piston 605 is disposed in the housing 288 to be movable in the first direction. A piston chamber is formed between an opposite side of the piston 605 and the housing 288.

The elastic member 282 is disposed between the piston 605 and the opposite side of the valve housing 230, and applies the elastic force to the piston 605 to the opposite side in the first direction.

A hydraulic pressure or a pneumatic pressure line 602 is connected to the housing 288 and fluidly communicates with the piston chamber. The control valve 600 is disposed on the line 602.

The position detecting sensor 286 detects a position of the piston 605, and the controller 290 controls the control valve 600 according to the driving information to control the position of the piston 605. Therefore, opening or closing of the first, second, and third passages 220a, 220b, and 220c can be controlled.

Here, if the controller 290 opens the control valve 600, the hydraulic pressure or the pneumatic pressure is supplied to the piston chamber and the piston 605 moves to the side in the first direction. In this case, the first, second, and third valves 235a, 235b, and 235c also move to the side in the first direction and can open the first, second, and third passages 220a, 220b, and 220c. If the control valve 600 releases the hydraulic pressure or the pneumatic pressure from the piston chamber, the piston 605 moves to the opposite side in the first direction by the elastic member 282. In this case, all the first, second, and third valves 235a, 235b, and 235c also move to the opposite side in the first direction and can close the first, second, and third passages 220a, 220b, and 220c.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A coolant control valve unit, comprising:
a valve housing including:
an inlet through which coolant is supplied,
a first coolant chamber and a second coolant chamber fluidly isolated from each other,
a first passage and a second passage communicating the inlet with the first and second coolant chambers, respectively, and
a first outlet and a second outlet respectively communicated with the first and second coolant chambers;
a first valve and a second valve disposed respectively in the first and second passages to be movable in a predetermined direction and configured to respectively close and open the first and second passages;
a driving plate connected with the first and second valves respectively through a first stem and a second stem and configured to simultaneously move the first and second valves in the predetermined direction by a distance; and
an actuator configured to move the driving plate in the predetermined direction and to control opening and closing of the first and second passages,
wherein the first passage has a first length along the predetermined direction, the second passage has a second length along the predetermined direction, and the first length is less than the second length such that the first and second passages are sequentially opened when the driving plate moves in the predetermined direction.

2. The coolant control valve of claim 1, wherein the valve housing further includes a third coolant chamber fluidly isolated from the first and second coolant chambers, a third passage communicating the inlet to the third coolant chamber, and a third outlet communicated with the third coolant chamber,
wherein the coolant control valve unit further includes a third valve disposed in the third passage to be movable in the predetermined direction and configured to close and open the third passage,
wherein the driving plate is connected with the third valve through a third stem and simultaneously moves the first, second, and third valves in the predetermined direction by a distance,
wherein the actuator moves the driving plate in the predetermined direction and controls opening and closing of the first, second, and third passages, and
wherein the third passage has a third length in the predetermined direction and the third length is greater than the second length such that the first, second, and third passages are sequentially opened when the driving plate moves in the predetermined direction.

3. The coolant control valve unit of claim 2, wherein the actuator is a solenoid type.

4. The coolant control valve unit of claim 3, wherein the actuator comprises:
a driving rod having a first end connected to the driving plate and a second end opposite to the first end, the driving rod configured to extend in the predetermined direction;
an armature coupled to the second end of the driving rod;
a coil wound around the driving rod and configured to apply force to the armature and to move the armature to a first side in the predetermined direction by receiving electric power; and
an elastic member configured to apply elastic force to the armature to a second side opposite to the first side in the predetermined direction.

5. The coolant control valve unit of claim 4, wherein the actuator further includes a position detecting sensor detecting a position of the armature.

6. The coolant control valve unit of claim 2, wherein the actuator is a cylinder type operated by a pneumatic pressure or a hydraulic pressure.

7. The coolant control valve unit of claim 6, wherein the actuator comprises:
a driving rod having a first end connected to the driving plate and a second end opposite to the first end, the driving rod configured to extend in the predetermined direction;
a piston coupled to the second end of the driving rod;
a line configured to supply a pneumatic pressure or a hydraulic pressure to the piston and to move the piston to a first side in the predetermined direction;

a control valve disposed on the line and configured to control supplying or discharging the pneumatic pressure or the hydraulic pressure; and an elastic member applying elastic force to the armature to a second side opposite to the first side in the predetermined direction.

8. An engine cooling system, comprising:
a cylinder block;
a cylinder head disposed on the cylinder block; and
a coolant control valve unit receiving a coolant discharged from the cylinder block or the cylinder head and supplying the coolant to cooling components,
wherein the coolant control valve unit comprises:
 a valve housing including:
  an inlet through which the coolant is supplied,
  a first coolant chamber and a second coolant chamber fluidly isolated from each other,
  a first passage and a second passage communicating the inlet with the first and second coolant chambers, respectively, and
  a first outlet and a second outlet respectively communicated with the first and second coolant chambers;
 a first valve and a second valve disposed respectively in the first and second passages to be movable in a predetermined direction and configured to respectively close and open the first and second passages;
 a driving plate connected with the first and second valves respectively through a first stem and a second stem and configured to simultaneously move the first and second valves in the predetermined direction by a distance; and
 an actuator configured to move the driving plate in the predetermined direction and to control opening and closing of the first and second passages,
wherein the first passage has a first length along the predetermined direction, the second passage has a second length along the predetermined direction, and the first length is less than the second length such that the first and second passages are sequentially opened when the driving plate moves in the predetermined direction.

9. The engine cooling system of claim 8, wherein the valve housing further includes a third coolant chamber fluidly isolated from the first and second coolant chambers, a third passage communicating the inlet to the third coolant chamber, and a third outlet communicated with the third coolant chamber,
 wherein the coolant control valve unit further includes a third valve disposed in the third passage to be movable in the predetermined direction and configured to close and open the third passage,
 wherein the driving plate is connected with the third valve through a third stem and simultaneously moves the first, second, and third valves in the predetermined direction by a distance,
 wherein the actuator moves the driving plate in the predetermined direction and controls opening or closing of the first, second, and third passages, and
 wherein the third passage has a third length in the predetermined direction and the third length is greater than the second length such that the first, second, and third passages are sequentially opened when the driving plate moves in the predetermined direction.

10. The engine cooling system of claim 9, wherein the actuator is a solenoid type.

11. The engine cooling system of claim 10, wherein the actuator comprises:
 a driving rod having a first end connected to the driving plate and a second end opposite to the first end, the driving rod configured to extend in the predetermined direction;
 an armature coupled to the second end of the driving rod;
 a coil wound around the driving rod and configured to apply force to the armature and move the armature to a first side in the predetermined direction by receiving electric power; and
 an elastic member applying elastic force to the armature to a second side opposite to the first side in the predetermined direction.

12. The engine cooling system of claim 11, wherein the actuator further includes a position detecting sensor detecting a position of the armature.

13. The engine cooling system of claim 9, the actuator is a cylinder type operated by a pneumatic pressure or a hydraulic pressure.

14. The engine cooling system of claim 13, wherein the actuator comprises:
 a driving rod having a first end connected to the driving plate and a second end opposite to the first end, the driving rod configured to extend in the predetermined direction;
 a piston coupled to the second end of the driving rod;
 a line configured to supply the pneumatic pressure or the hydraulic pressure to the piston and to move the piston to a first side in the predetermined direction;
 a control valve disposed on the line and configured to control supplying or discharging the pneumatic pressure or the hydraulic pressure; and
 an elastic member applying elastic force to the armature to a second side opposite to the first side in the predetermined direction.

15. The engine cooling system of claim 9, wherein the cooling components include a low-pressure exhaust gas recirculation (EGR) cooler, a heater, an EGR valve, an oil cooler, and a radiator.

16. The engine cooling system of claim 15, wherein the low-pressure EGR cooler and the heater are connected to the first outlet to receive the coolant simultaneously,
 the EGR valve and the oil cooler are connected to the second outlet to receive the coolant simultaneously, and
 the radiator is connected to the third outlet to receive the coolant.

* * * * *